(12) United States Patent
Kim (10) Patent No.: US 7,620,823 B2
(45) Date of Patent: Nov. 17, 2009

(54) SMART CARDS HAVING PROTECTION CIRCUITS THEREIN THAT INHIBIT POWER ANALYSIS ATTACKS AND METHODS OF OPERATING SAME

(75) Inventor: Seo-Kyu Kim, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 1269 days.

(21) Appl. No.: 10/429,084

(22) Filed: May 2, 2003

(65) Prior Publication Data

US 2004/0158728 A1  Aug. 12, 2004

(30) Foreign Application Priority Data

Feb. 6, 2003  (KR)  ............... 10-2003-0007517

(51) Int. Cl.
*H04L 9/32* (2006.01)
(52) U.S. Cl. ............... 713/194; 726/26; 713/300
(58) Field of Classification Search ............... 726/26, 726/2; 713/300, 1, 2, 188, 194; 380/200, 380/201, 255, 277; 257/679, 312, 352, 532
See application file for complete search history.

(56) References Cited

U.S. PATENT DOCUMENTS

| 4,495,471 A | * | 1/1985 | Barrett ............... 330/151 |
| 4,575,621 A | | 3/1986 | Dreifus |
| 4,769,589 A | * | 9/1988 | Rosenthal ............... 323/313 |
| 5,173,835 A | | 12/1992 | Cornett et al. |
| 5,177,430 A | * | 1/1993 | Mohel ............... 323/284 |
| 5,563,779 A | | 10/1996 | Cave et al. |
| 5,880,523 A | | 3/1999 | Candelore |
| 5,965,912 A | | 10/1999 | Stolfa et al. |

(Continued)

FOREIGN PATENT DOCUMENTS

EP  1 113 386 A2  7/2001

(Continued)

OTHER PUBLICATIONS

Office Action, German Patent Application No. 10 2004 003 078.2-53, Oct. 12, 2004.

(Continued)

*Primary Examiner*—Beemnet W Dada
*Assistant Examiner*—Joseph Pan
(74) *Attorney, Agent, or Firm*—Myers Bigel Sibley & Sajovec (57) ABSTRACT

A smart card includes an integrated circuit device having secure information therein. A protection circuit is provided within the smart card. This protection circuit is configured to protect the integrated circuit device, by preventing unauthorized retrieval of the secure information using a power analysis technique. This is done by maintaining at least one power supply line that is electrically coupled to the integrated circuit device at a substantially uniform voltage when the integrated circuit device is active. This uniform voltage operates to mask the operations performed by the integrated circuit device, and thereby conceal these operations from external hardware that may be designed to support the power analysis technique. In particular, a variable capacitor is provided to supply displacement current to the power supply line and the integrated circuit while the capacitance of the capacitor is gradually decreased at an appropriate rate to support a constant supply voltage on the power supply line.

13 Claims, 6 Drawing Sheets

U.S. PATENT DOCUMENTS

| | | | |
|---|---|---|---|
| 6,042,686 A * | 3/2000 | Dible et al. | 156/345.44 |
| 6,229,443 B1 * | 5/2001 | Roesner | 340/572.1 |
| 6,275,681 B1 | 8/2001 | Vega et al. | |
| 6,278,158 B1 | 8/2001 | Pastor et al. | |
| 6,291,999 B1 * | 9/2001 | Nishimori et al. | 324/464 |
| 6,320,770 B1 * | 11/2001 | Feuser | 363/59 |
| 6,400,550 B1 | 6/2002 | Wood et al. | |
| 6,419,159 B1 * | 7/2002 | Odinak | 235/492 |
| 6,441,449 B1 | 8/2002 | Xu et al. | |
| 6,469,919 B1 * | 10/2002 | Bennett | 363/56.02 |
| 6,507,913 B1 * | 1/2003 | Shamir | 726/36 |
| 6,621,467 B1 * | 9/2003 | Marsh | 343/850 |
| 6,721,196 B1 * | 4/2004 | Grassl | 365/63 |
| 6,803,829 B2 * | 10/2004 | Duncan et al. | 331/34 |
| 6,946,847 B2 * | 9/2005 | Nishimori et al. | 324/600 |
| 7,017,048 B2 * | 3/2006 | Schneider et al. | 713/194 |
| 7,244,475 B2 * | 7/2007 | Higashiura | 427/575 |
| 2002/0124183 A1 * | 9/2002 | Marinet et al. | 713/200 |
| 2002/0170678 A1 * | 11/2002 | Hayashi et al. | 156/345.48 |
| 2003/0058663 A1 * | 3/2003 | Bennett | 363/40 |
| 2004/0030905 A1 * | 2/2004 | Chow et al. | 713/189 |
| 2004/0078588 A1 * | 4/2004 | Chow et al. | 713/200 |

FOREIGN PATENT DOCUMENTS

| | | |
|---|---|---|
| EP | 1 113 386 A3 | 7/2001 |
| EP | 1 282 072 A1 | 2/2003 |
| EP | 1098267 A1 | 7/2007 |
| EP | 1098267 B1 | 7/2007 |
| JP | 05-128319 | 5/1993 |
| JP | 11-085922 | 3/1999 |
| JP | 11-250216 | 9/1999 |
| JP | 11-353446 | 12/1999 |
| JP | 2000-197365 | 7/2000 |

OTHER PUBLICATIONS

Rankl et al., "Smart Card Handbook," Second Edition, John Wiley & Sons, Ltd., Reprinted Feb. 2001, Jun. 2002, pp. 420-424.

Almanei, S., "Protecting Smart Cards from Power Analysis Attacks," Oregon State University, May 28, 2002, 4 pages.

Shamir, A., "Protecting smart cards from passive power analysis with detached power supplies," Cryptographic Hardware and Embedded Systems—CHES 2000, LNCS 1965, 2000, pp. 71-77.

Chang, H., "Differential Power Analysis Attack on Smart Card," ICE615 Network Security, Oct. 8, 2002, Admitted Prior Art.

Notice to File Response to a Rejection, Korean Application No. 2003-07517.

Combined Search and Examination Report, Application No. GB0401498.1, May 26, 2004.

* cited by examiner

Fig. 1

(PRIOR ART)

Fig. 2

(PRIOR ART)

SMART CARDS HAVING PROTECTION CIRCUITS THEREIN THAT INHIBIT POWER ANALYSIS ATTACKS AND METHODS OF OPERATING SAME

REFERENCE TO RELATED APPLICATION

This application claims priority to Korean Application Serial No. 2003-7517, filed Feb. 6, 2003, the disclosure of which is hereby incorporated herein by reference.

FIELD OF THE INVENTION

The present invention relates to smart card devices and methods of operating same.

BACKGROUND OF THE INVENTION

Integrated circuit smart cards have been used frequently in credit card, banking card and identification card applications and other card-based applications requiring secure data transactions. Smart cards typically include an embedded integrated circuit that includes both microprocessor components and nonvolatile memory, which may store secure information (e.g., secret key codes, cryptograms, passwords, etc.) and other information that may be used by the microprocessor. The use of secret codes enables the smart cards to carry out secure cryptographic computations or communications when they are used in conjunction with smart card readers and other compatible devices.

Many techniques have been developed to unlawfully acquire the secure information stored within smart cards. Some of these techniques include cryptanalytic techniques, which can generally be classified into two categories. These categories include passive attack techniques and active attack techniques. In a passive attack technique, operations are typically performed to measure external electrical characteristics of a smart card when it is undergoing normal operations. For example, external current and voltage signals generated or received by the smart card may be measured to extract internal secure information, without damaging or destroying the card or its internal components. In contrast, in an active attack technique, secure information may be extracted by probing the card in a manner that damages or destroys one or more internal components and renders the card unusable for its intended use.

Certain passive attacks may analyze a power consumption curve of a smart card when the card is performing cryptographic operations. These types of passive attacks include both simple power analysis (SPA) attacks and differential power analysis (DPA) attacks. In an SPA attack, an attacker evaluates a single power consumption curve and determines from that curve the identity of the instructions and possibly the Hamming weight of data words read from or written to the card. However, in a DPA attack, the attacker may evaluate multiple power consumption curves. These passive attacks are more fully described in an article by A. Shamir, entitled "Protecting Smart Cards from Passive Power Analysis with Detached Power Supplies," Crytographic Hardware and Embedded Systems (CHES), LNCS 1965 (200), pp. 71-77.

Figure 1:
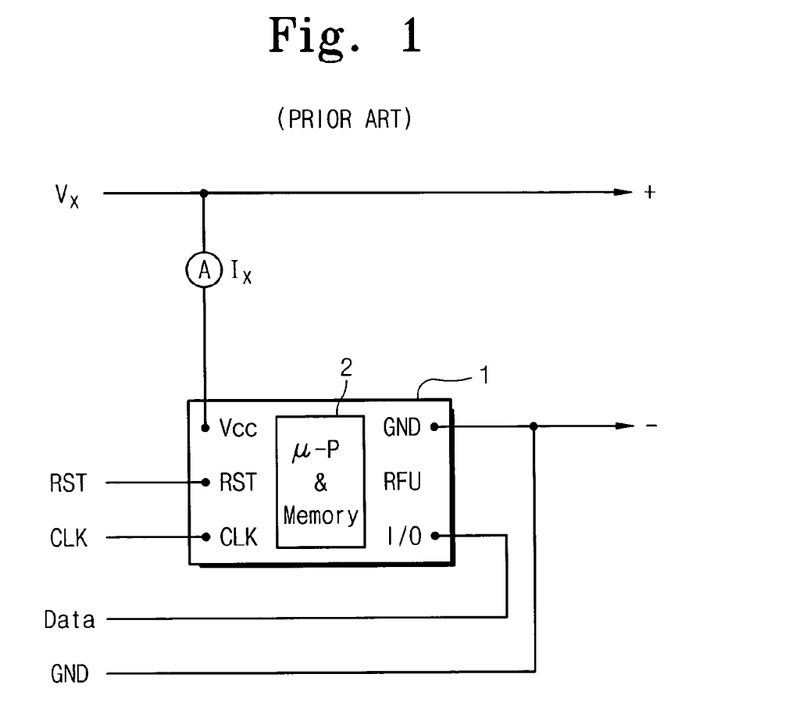
FIG. 1 illustrates a smart card chip according to the prior art.
Figure 2:
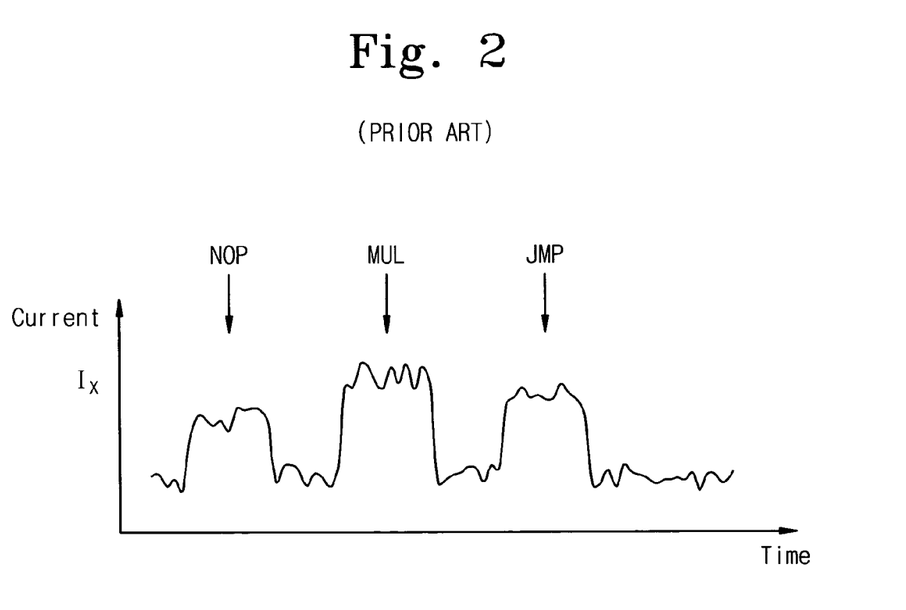
FIG. 2 illustrates a current waveform that may be evaluated when performing an SPA attack on the smart card chip of FIG. 1.

FIGS. 1-2 illustrate operations to perform an SPA attack on a smart card containing an integrated circuit (IC) chip 1. This chip 1 is more fully described at pages 420-424 of a textbook by W. Rankl and W. Effing entitled Smart Card Handbook, John Wiley & Sons, Ltd. (ISBN 0 471 98875 8) (2000). As illustrated, the IC chip 1, which includes a microprocessor and memory elements 2, has six terminals. These terminals include a power supply terminal (Vcc), a ground reference terminal (GND), a reset terminal (RST) for receiving a reset signal, a clock terminal (CLK) for receiving a clock signal, an I/O terminal that is configured to output and receive commands and/or data (DATA), and a reserved use (RFU) terminal. The power supply terminal Vcc receives an external voltage (shown as Vx). An ammeter (A) is also provided for measuring the magnitude and direction of a current signal Ix that is supplied to the IC chip 1. As will be understood by those skilled in the art, when the external voltage Vx is supplied to the IC chip 1 and the microprocessor and memory elements 2 undergo operations, the current measured by the ammeter (A) may reflect the nature of the operations being performed. Thus, as illustrated by FIG. 2, the current signal Ix may constitute a waveform that identifies whether the IC card 1 is undergoing a non-operation (NOP), a multiplying operation (MUL) or a jumping operation (JMP). Moreover, by capturing and evaluating the current waveform as a function of time, cryptanalysis may perform an SPA attack and thereby extract a secret code retained by the memory element. The IC chip 1 of FIG. 1 is also susceptible to DPA attacks, which may evaluate the magnitude and direction of differential input currents.

U.S. Pat. No. 6,507,913 to Shamir discloses an apparatus for protecting smart cards against SPA and DPA attacks when they are inserted into card readers. As illustrated by FIG. 1 of the '913 patent, the apparatus includes two capacitors 3 and 4 that are embedded within a smart card substrate (e.g., plastic card). The capacitors 3 and 4 are switched in an alternating back-and-forth sequence so that at any given time one of them is being charged by an external power supply and the other one is being discharged by a smart card chip 1. Thus, during the operation of the smart card 10, the external power supply remains detached from the smart card chip 1. Nonetheless, because the voltages on the capacitors 3 and 4 will be reduced by an amount proportional to the amount of current consumed by the chip 1 during each switching interval, it may be possible to indirectly detect the current consumption profile of the chip 1 by evaluating the external pulsed current waveforms provided to the capacitors 3 and 4 after they have been partially discharged in each cycle. Accordingly, notwithstanding the additional protection provided by the apparatus of the '913 patent, SPA and DPA attacks may still be possible.

SUMMARY OF THE INVENTION

Embodiments of the present invention include integrated circuit security systems having reduced susceptibility to passive and active attacks. In some embodiments, a smart card operates as a security system and this smart card includes an integrated circuit device having secure information therein. A protection circuit is also provided within the smart card. This protection circuit is configured to protect the integrated circuit device, by preventing unauthorized retrieval of the secure information using a power analysis technique. This is done by maintaining at least one power supply line that is electrically coupled to the integrated circuit device at a substantially uniform voltage when the integrated circuit device is active. This uniform voltage operates to mask the operations performed by the integrated circuit device, and thereby conceals these operations from external or internal hardware that may be designed to support a passive attack or an active attack. In particular, a variable capacitor is provided to supply positive displacement current to the power supply line and the integrated circuit while the capacitance of the variable capacitor is gradually decreased at an appropriate rate to support a constant supply voltage on the power supply line.

According to preferred aspects of this embodiment, the protection circuit includes a control circuit that is configured to increase a value of the variable capacitor in response to detecting an increase in a voltage of the power supply line and is further configured to decrease the value of the variable capacitor in response to detecting a decrease in the voltage of the power supply line. In this manner, the voltage regulating relationship can be maintained for an active time interval having a sufficiently long duration to enable the integrated circuit to perform its intended functions.

The control circuit may include a comparator that is configured to compare the voltage of the power supply line against a reference voltage, which may be sustained by an on-chip battery. An up/down counter may also be provided, which is electrically coupled to an output of the comparator. This up/down counter may operate to generate a decreasing count signal as the voltage on the power supply line increases above the reference voltage. This increase in the voltage of the power supply line may occur when the smart card is connected to an external power source. Alternatively, the counter may operate to generate an increasing count signal as the voltage on the power supply line decreases below the reference voltage during the active time interval. In some embodiments, a digital-to-analog converter (DAC) may also be provided to covert a digital count signal into an analog signal that drives a control terminal of the variable capacitor. In this manner, the comparator, counter, converter and variable capacitor operate collectively as a preferred voltage regulator that maintains the voltage on the power supply line at a substantially uniform value during the active time interval.

Still further embodiments of the present invention include a smart card formed by a substrate having an integrated circuit device therein. A protection circuit is also provided in the substrate. The protection circuit is configured to inhibit cryptanalytic analysis of the integrated circuit device by maintaining at least one power supply line that is electrically coupled to the integrated circuit device at substantially a constant power supply voltage ($V_s$). This protection circuit includes a variable capacitor having a capacitance equal to $C_v$ and a first terminal electrically connected to the power supply line. The protection circuit also includes circuit elements therein that are connected to a control terminal of the variable capacitor and the power supply line. These elements operate as means for varying the control terminal so that the following relationship is maintained valid over a discharge time interval (t1-to-t2) when the integrated circuit device is active and the variable capacitor is supplying positive displacement current to the integrated circuit device:

$$\int I_d dt = V_s(C_v(t1) - C_v(t2)),$$

where $V_s$ represents the substantially constant supply voltage on the power supply line, $I_d$ represents the positive displacement current provided to the power supply line, $C_v(t2)$ represents the capacitance of the variable capacitor at time t2, $C_v(t1)$ represents the capacitance of the variable capacitor at time t1 and $C_v(t1)$ is greater than $C_v(t2)$.

In still further embodiments of the present invention, the protection circuit may be configured to inhibit cryptanalytic analysis of the integrated circuit device by maintaining a signal line that is electrically coupled to the integrated circuit device at about a first voltage using a variable energy storage element that is configured to supply charge to the signal line when said integrated circuit device is active. This variable energy storage element may be selected from the group consisting of variable capacitors, variable inductors and combinations thereof.

DESCRIPTION OF PREFERRED EMBODIMENTS

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals.

Figure 3:
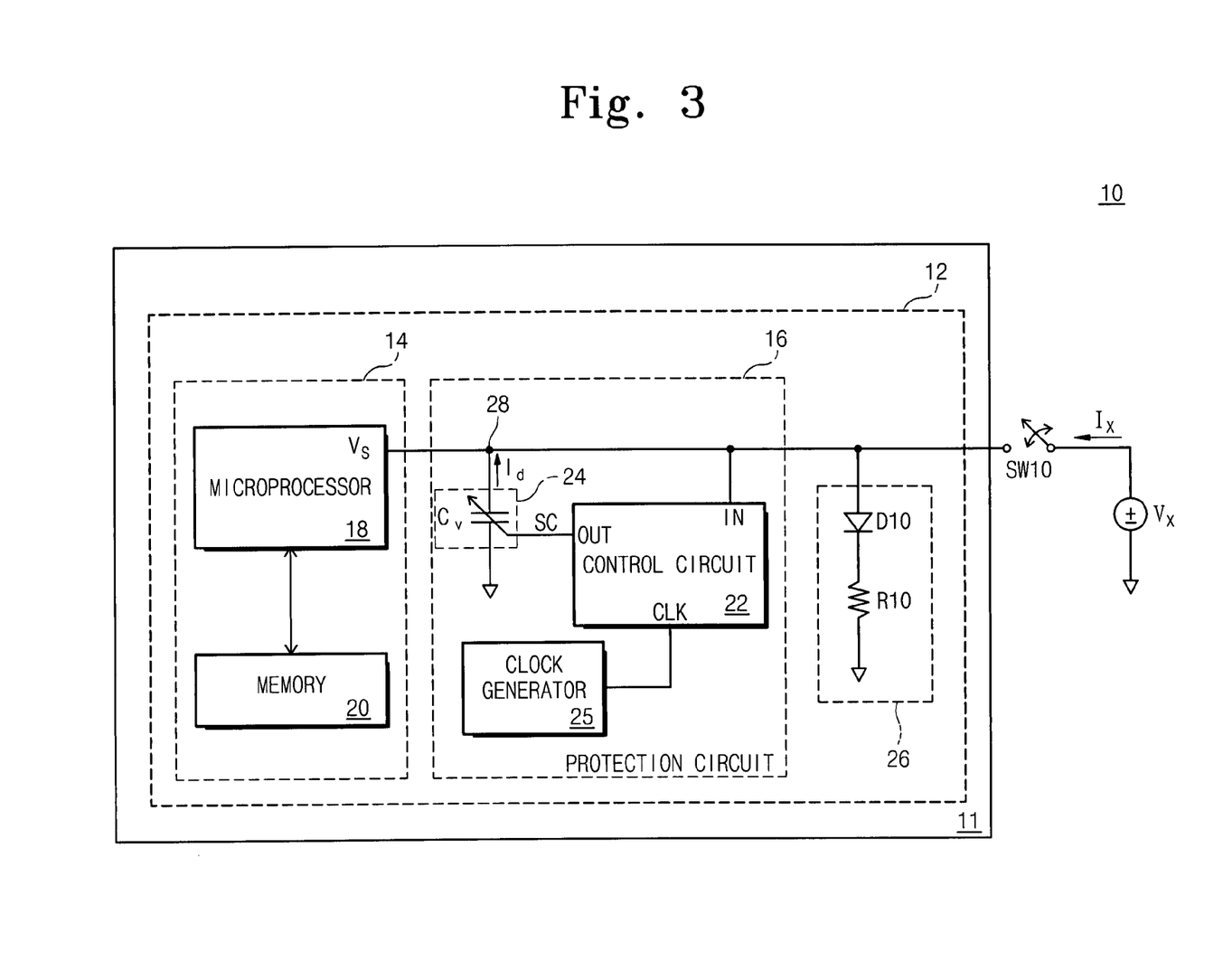
FIG. 3 is a block diagram of a smart card according to an embodiment of the present invention.

Referring now to FIG. 3, a smart card 10 according to an embodiment of the present invention will be described. This smart card 10 includes a substrate 11 having a smart card chip 12 therein. The smart card chip 12 is illustrated as including an integrated circuit device 14 and a protection circuit 16, which are electrically coupled to a power supply line 28. As illustrated, the power supply line 28 is electrically coupled to a power supply terminal (shown as $V_s$) of the integrated circuit device 14 and an input terminal of the protection circuit 16. The integrated circuit device 14 may be a conventional computational device that performs various smart card operations and retains secure information. The integrated circuit device 14 is illustrated as including a microprocessor device 18 and a memory device 20 (e.g., nonvolatile memory device) that is configured to supply secure information to and from the microprocessor device 18. In some other embodiments, the integrated circuit device 14 may be further defined by additional and/or different integrated circuit elements than those illustrated by FIG. 3.

The power supply line 28 may be coupled to a power supply terminal of the smart card 10. During normal operations, including those responsive to insertion of the smart card 10 into a card reader or other device, the power supply terminal may receive current $I_x$ from an external voltage source $V_x$. As illustrated, an external switch SW10 is provided to control the supply of power to the smart card 10.

The smart card chip 12 may include an overvoltage protection circuit 26 that is electrically coupled to the power supply line 28. This overvoltage protection circuit 26 is illustrated as including a diode D10 and a resistor R10, which are electrically connected in series. As will be understood by those skilled in the art, the overvoltage protection circuit 26 will operate to protect the integrated circuit device 14 and protection circuit 16 from excessive voltage spikes, which may occur in response to the periodic switching of the external switch SW10.

The protection circuit 16 is illustrated as including a control circuit 22, a variable capacitor 24 ($C_v$) and a clock generator 25. As illustrated, the variable capacitor 24 is configured to supply the power supply line 28 with positive displacement current ($I_d$) when the external switch SW10 is open and negative displacement current when the external switch SW10 is closed and the variable capacitor 24 is being charged. The magnitude of the capacitance provided by the variable capacitor 24 is varied by increasing or decreasing the analog value of a control signal, shown as SC. This control signal SC is generated at an output of the control circuit 22. The capacitance of the variable capacitor 24 may be inversely proportional to the analog value of the control signal SC. Accordingly, decreases in the control signal SC may lead to increases in the capacitance of the variable capacitor 24 and increases in the control signal SC may lead to decreases in the capacitance of the variable capacitor 24.

Figure 7:
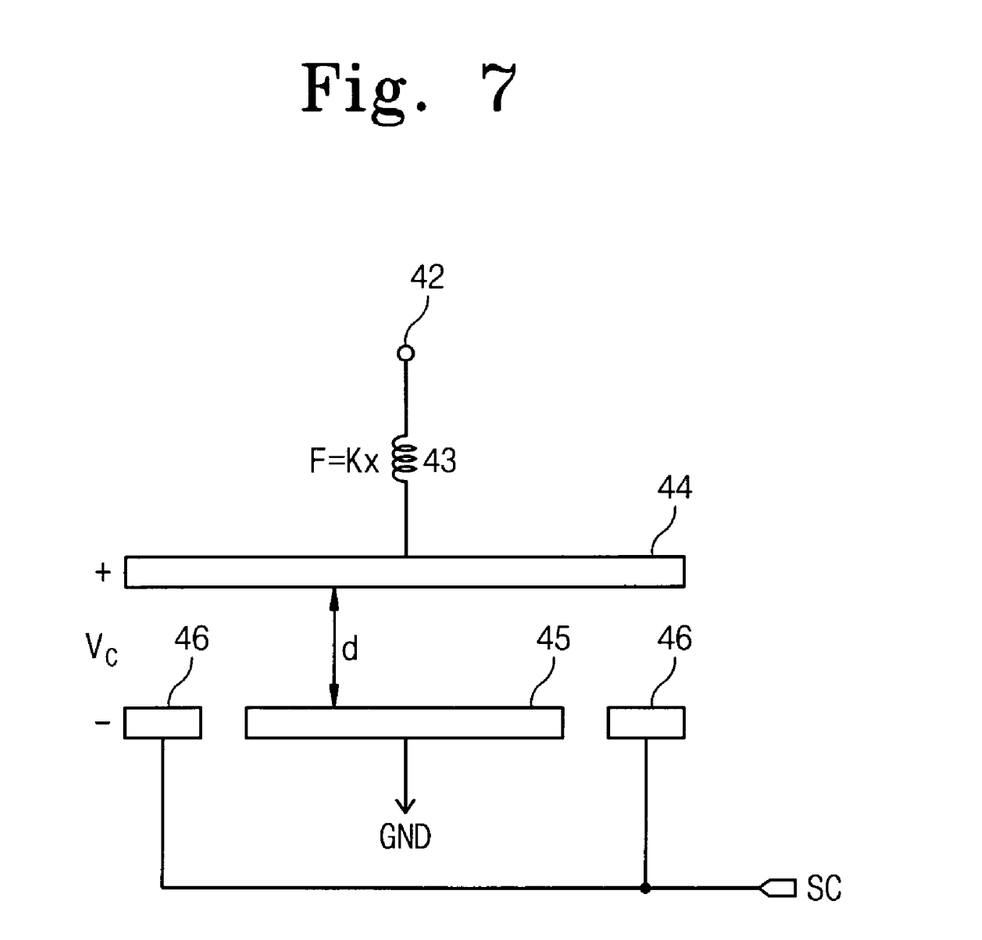
FIG. 7 is a diagram that illustrates a variable capacitor having parallel plates that move relative to each other in response to an analog signal.

As illustrated by FIG. 7, a variable capacitor 24 may be defined by a pair of parallel electrodes that are configured to move relative to each other, in response to a control signal SC. A top electrode 44 and a bottom electrode are provided. The top electrode 44 may be treated as being electrically connected to a relatively high voltage (e.g., 5 volts), which is receives from node 42. The bottom electrode includes an outer electrode portion 46, which receives the control signal SC, and an inner electrode portion 45 that is electrically connected to a ground reference potential (GND). When the control signal SC increases in voltage, the voltage Vc between the electrodes is decreased and the distance "d" increases as the top electrode 44 moves upward in response to the upward force F provided by the spring 13 (F=kx, where k is a spring constant and x represents the migration distance of the top electrode 44). Because the capacitance of the variable capacitor 24 is related by the expression C=∈A/d, where A represents that electrode area and ∈ represents a dielectric constant, the capacitance will decrease as d increases and vice versa. Thus, fluctuations in the analog value of the control signal SC can be controlled to vary the capacitance of the variable capacitor 24. Descriptions of conventional variable capacitors can also be found in the following U.S. patents: U.S. Pat. Nos. 5,173,835, 5,192,871, 5,965,912, 6,278,158, 6,400,550 and 6,441,449. In alternative embodiments, the protection circuit 16 may utilize a variable storage element that is selected from the group consisting of variable capacitors, variable inductors and combinations thereof.

Figure 4:
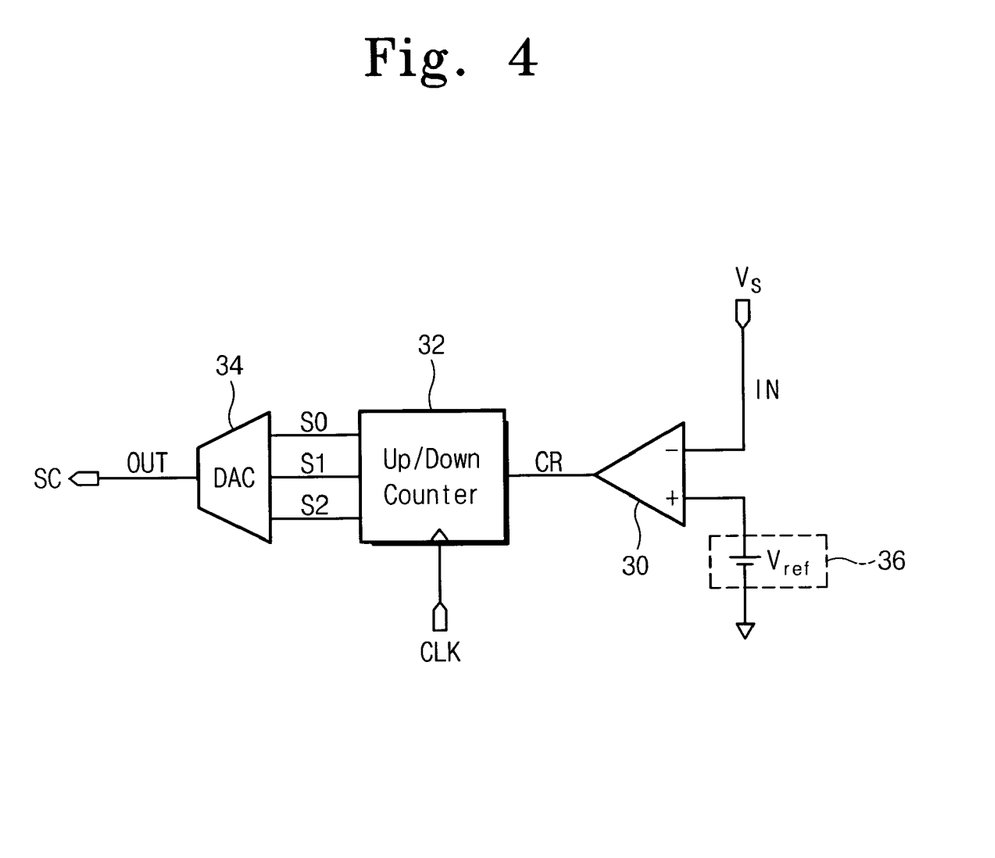
FIG. 4 is an electrical schematic of the control circuit of FIG. 3.

As illustrated by FIG. 4, the control circuit 22 may include a voltage comparator 30 that is configured to compare a power supply voltage (Vs) on the power supply line 28 against a reference voltage, shown as $V_{ref}$. In some cases, the reference voltage may be generated by a battery 36. The value of the reference voltage $V_{ref}$ may be set to a level that is slightly smaller than the value of the external voltage source $V_x$ (e.g., $V_{ref}$=5.0 Volts and $V_x$=5.1 Volts). Based on the illustrated configuration of the comparator 30, the digital output signal CR will be set to a logic 0 value whenever $V_s$>$V_{ref}$ and a logic 1 value whenever $V_s$<$V_{ref}$. This digital output signal CR is provided as an input to an UP/DOWN counter 32.

Figure 5:
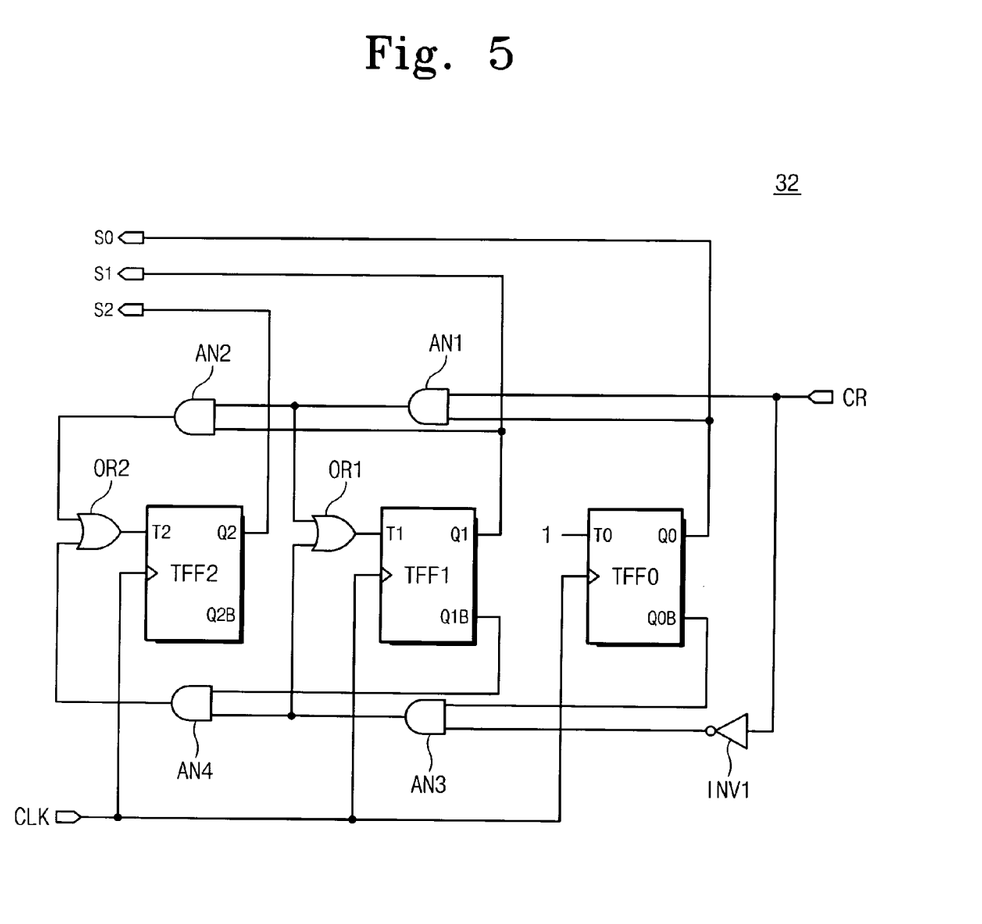
FIG. 5 is an electrical schematic of the UP/DOWN counter of FIG. 3.

An exemplary counter 32 is illustrated by FIG. 5. In particular, the illustrated counter 32 includes three flip-flops (TFF0-TFF2), four AND gates (AN1-AN4), two OR gates (OR1-OR2) and an inverter INV1. The three flip-flops are illustrated as T-type flip flops. The counter 32 generates a multi-bit count signal (S2-S0) that is incremented or decremented in-sync with the clock signal CLK. As will be understood by those skilled in the art, a T-type flip-flop may be constructed from a J-K master-slave flip-flop, by connecting both J and K inputs together. In this manner, a T=1 input will result in a true output Q that toggles in-sync with the clock signal CLK and a T=0 input will result in true output that remains unchanged in response to the clock signal CLK. Accordingly, if the digital output signal CR is set to a logic 1 value, then the multi-bit count signal S2-S0 will increment by one bit each cycle from a minimum value of S2,S1,S0=(0,0,0) to a maximum value of S2,S1,S0=(1,1,1). On the other hand, if the digital output signal CR is set to a logic 0 value, then the multi-bit count signal S2-S0 will decrement by one bit each cycle to a minimum value of S2,S1,S0=(0,0,0). The rate at which the multi-bit count signal S2-S0 changes is a function of the frequency of the clock signal CLK.

Referring again to FIG. 4, the multi-bit count signal S2-S0 is supplied to a digital-to-analog converter (DAC) 34, which generates an analog output signal SC having a magnitude that increases in response to an increasing multi-bit count signal S2-S0 and decreases in response to a decreasing multi-bit count signal S2-S0. Accordingly, whenever the power supply voltage $V_s$ is greater than $V_{ref}$ (and CR=0), the magnitude of the analog output signal SC will progressively decrease in-sync with the clock signal CLK. In contrast, whenever the power supply voltage $V_s$ is less than $V_{ref}$ (and CR=1), the magnitude of the analog output signal SC will progressively increase in-sync with the clock signal CLK.

The capacitance of the variable capacitor $C_v$ 24 is configured to decrease in response to an increasing output signal SC and increase in response to a decreasing output signal SC. In particular, the control circuit 22 and variable capacitor 24 are configured so that the following relationship will remain valid over an entire charging time interval from t0 to t1, during which the external switch SW10 is closed and the variable capacitor 24 is being charged by the external voltage source $V_x$:

$$-\int I_d(t)dt = V_s(C_v(t1)-C_v(t0)), \quad (1)$$

where $V_s$ represents the substantially constant supply voltage on the power supply line 28, $I_d$ represents the displacement current provided from the variable capacitor 24 to the power supply line 28, $C_v(t1)$ represents the capacitance of the variable capacitor 24 at the end of the charging time interval (when the external switch SW10 is reopened) and $C_v(t0)$ represents the capacitance of variable capacitor 24 when the external switch SW10 is closed. When the switch SW10 is closed during the time interval from t0 to t1, the displacement current $I_d$ will be negative.

The control circuit 22 and variable capacitor 24 are also configured so that the following relationship will remain valid over an entire discharging time interval from t1 to t2, during which the external switch SW10 is open and the variable capacitor 24 is supplying positive displacement current to the integrated circuit device 14:

$$\int I_d(t)dt = V_s(C_v(t1)-C_v(t2)), \quad (2)$$

where $V_s$ represents the substantially constant supply voltage on the power supply line 28, $I_d$ represents the positive displacement current provided to the power supply line 28, $C_v(t2)$ represents the capacitance of the variable capacitor 24 at the end of an active time interval (when the external switch SW10 switches from open to closed) and $C_v(t1)$ represents the capacitance of variable capacitor 24 when the external switch SW10 is first opened.

Figure 6A:
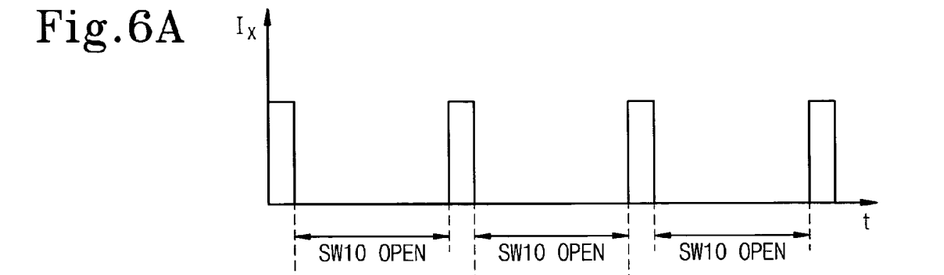
FIGS. 6A-6D are timing waveforms that illustrate operation of the protection circuit of FIG. 3.
Figure 6B:
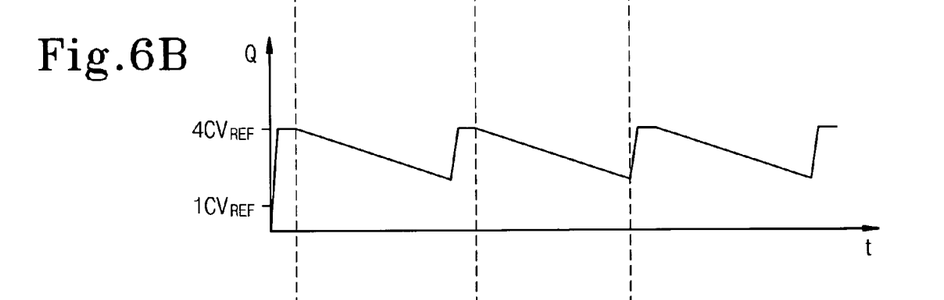
Figure 6C:
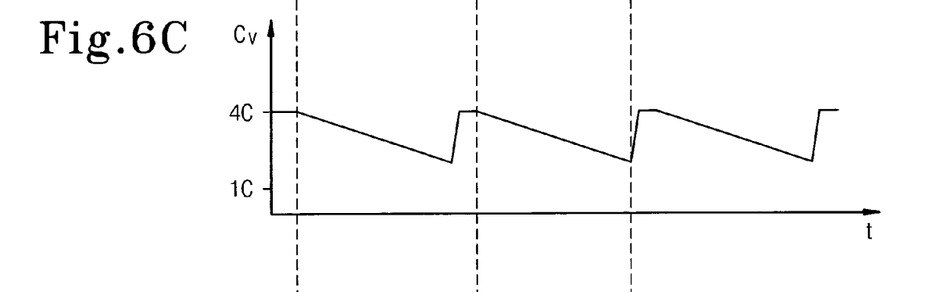
Figure 6D:
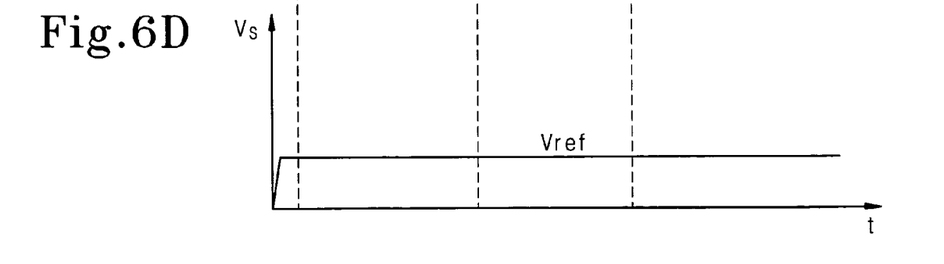

Referring now to FIG. 6A, a timing diagram is provided that illustrates a relationship between input current $I_x$ versus time, for charging time periods when the external switch SW10 is closed and the external voltage source $V_x$ is supplying positive current to the smart card 10 and for discharging time periods when the external switch SW10 is open and variable capacitor 24 is being discharged by the integrated circuit device 14. In FIG. 6B, a timing diagram is provided that illustrates the amount of charge Q on the variable capacitor 24 as a function of time. In FIG. 6C, a timing diagram is provided that illustrates how the capacitance of the variable capacitor 24 is changed in order to maintain a constant power supply voltage $V_s$ on the power supply line 28. When the external switch SW10 is closed, the variable capacitor 24 increases its capacitance at an upward rate sufficient to maintain a constant supply voltage $V_s$ and when the external switch SW10 is open, the variable capacitor 24 decreases its capacitance at a downward rate sufficient to maintain the constant supply voltage $V_s$. Thus, as illustrated by FIG. 6D, the constant power supply voltage $V_s$ may be maintained at a constant level that is determined by a value of the reference voltage ($V_{ref}$) supplied to the positive terminal of the voltage comparator 30.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A smart card, comprising:
   a substrate;
   an integrated circuit device in said substrate; and
   a protection circuit in said substrate, said protection circuit configured to inhibit cryptanalytic analysis of said integrated circuit device by maintaining a power supply line that is electrically coupled to said integrated circuit device at a first voltage when said integrated circuit device is active, said protection circuit comprising:
      a variable capacitor that is configured to supply displacement current to the power supply line when said integrated circuit is active; and
      a control circuit that is configured to increase a value of the variable capacitor in response to detecting an increase in a voltage of the power supply line and is further configured to decrease the value of the variable capacitor in response to detecting a decrease in the voltage of the power supply line.

2. The card of claim 1, wherein said control circuit comprises:
   a comparator that is configured to compare the voltage of the power supply line against a reference voltage; and
   an up/down counter that is electrically coupled to an output of said comparator.

3. The card of claim 2, wherein said control circuit further comprises:
   a digital-to-analog converter having at least one input that is electrically coupled to an output of said up/down counter and an output electrically coupled to the variable capacitor.

4. The card of claim 1, wherein said substrate is a flexible substrate having width and length dimensions that are substantially equivalent to width and length dimensions of a credit card.

5. A smart card, comprising:
   a substrate;
   an integrated circuit device in said substrate; and
   a protection circuit in said substrate, said protection circuit configured to inhibit cryptanalytic analysis of said integrated circuit device by maintaining a power supply line that is electrically coupled to said integrated circuit device at a power supply voltage ($V_s$), said protection circuit comprising:
      a variable capacitor having a capacitance equal to $C_v$, and a first terminal electrically connected to the power supply line; and
      means, electrically coupled to the power supply line and a control terminal of said variable capacitor, for varying the control terminal so that the following relationship is maintained valid over a discharge time interval from time t1 to time t2 when said integrated circuit device is active:

$$\int I_d(t)dt = V_s((C_v(t1)-C_v(t2))),$$

where $I_d(t)$ equals a magnitude of a displacement current provided from said variable capacitor to the power supply line during the discharge time interval.

6. The card of claim 5, wherein said varying means comprises:
   a comparator that is configured to compare a voltage on the power supply line against a reference voltage; and
   an up/down counter that is electrically coupled to an output of said comparator.

7. The card of claim 6, wherein said varying means comprises:
   a digital-to-analog converter having at least one input that is electrically coupled to an output of said up/down counter and an output electrically coupled to said variable capacitor.

8. The card of claim 5, further comprising an overvoltage protection circuit electrically coupled to the power supply line.

9. A method of operating a smart card having an integrated circuit device and a variable capacitor therein, comprising the step of:
   supplying positive displacement current from the variable capacitor to a power supply line connected to the integrated circuit device while simultaneously decreasing a capacitance of the variable capacitor at a sufficient rate to maintain the power supply line at a substantially uniform voltage.

10. The method of claim 9, further comprising the step of:
    supplying positive displacement current from the power supply line to the variable capacitor while simultaneously increasing a capacitance of the variable capacitor at a sufficient rate to maintain the power supply line at the substantially uniform voltage.

11. The method of claim 9, wherein decreasing the capacitance of the variable capacitor comprises decrementing the capacitance of the variable capacitor in steps that are synchronized with a clock signal.

12. The method of claim 10, wherein increasing the capacitance of the variable capacitor comprises incrementing the capacitance of the variable capacitor in steps that are synchronized with a clock signal.

13. The method of claim 12, wherein increasing the capacitance of the variable capacitor comprises the steps of:
    generating a multi-bit count signal that decreases in-sync with the clock signal; and
    converting the multi-bit count signal into an analog signal that is provided to a control terminal of the variable capacitor.

* * * * *